(No Model.) 2 Sheets—Sheet 1.
J. R. ROBERTS.
INCUBATOR.
No. 515,554. Patented Feb. 27, 1894.
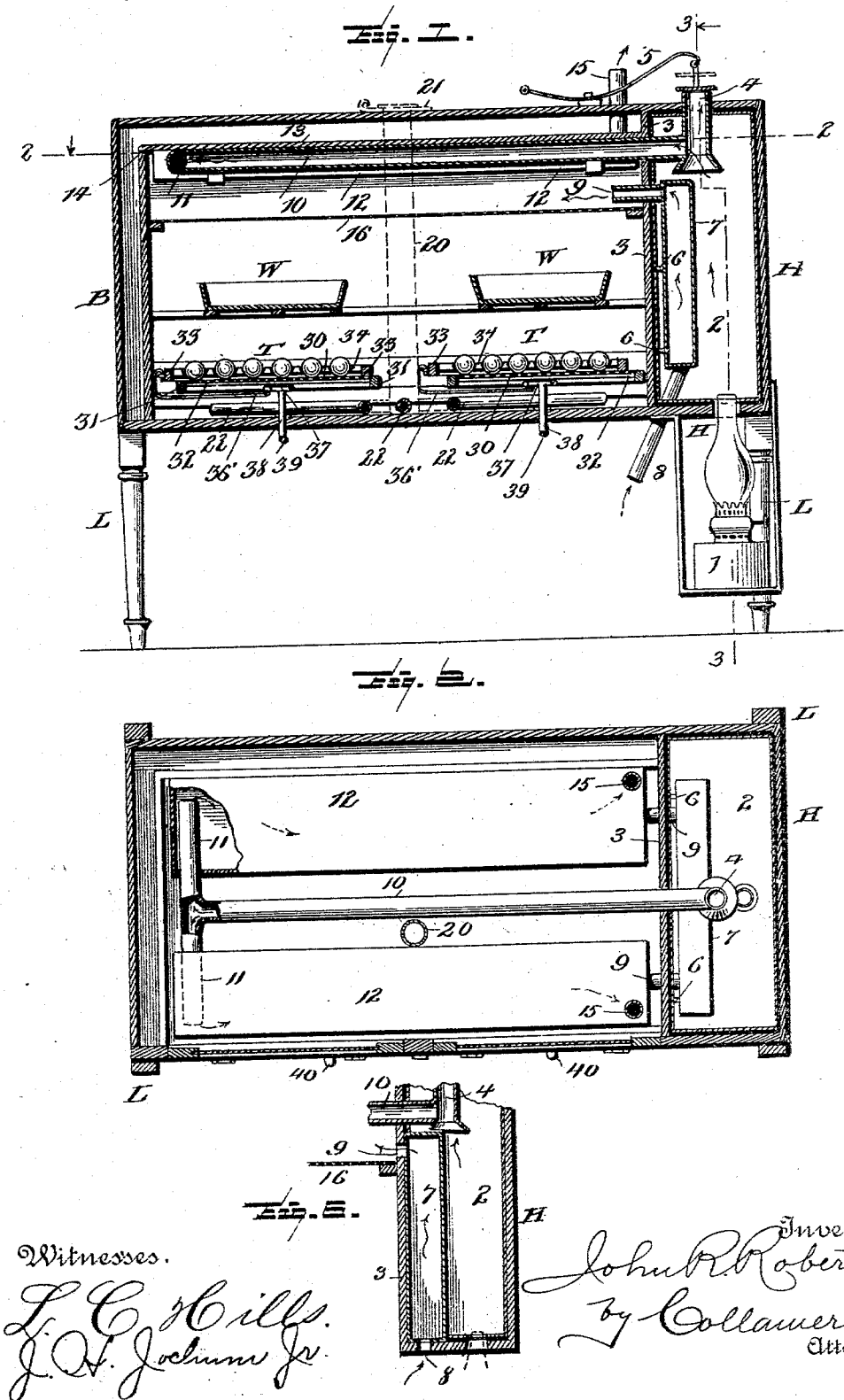
Witnesses.
L. C. Hills.
J. H. Jochum Jr.
Inventor:
John R. Roberts,
by Collamer & Co.
Attorneys.

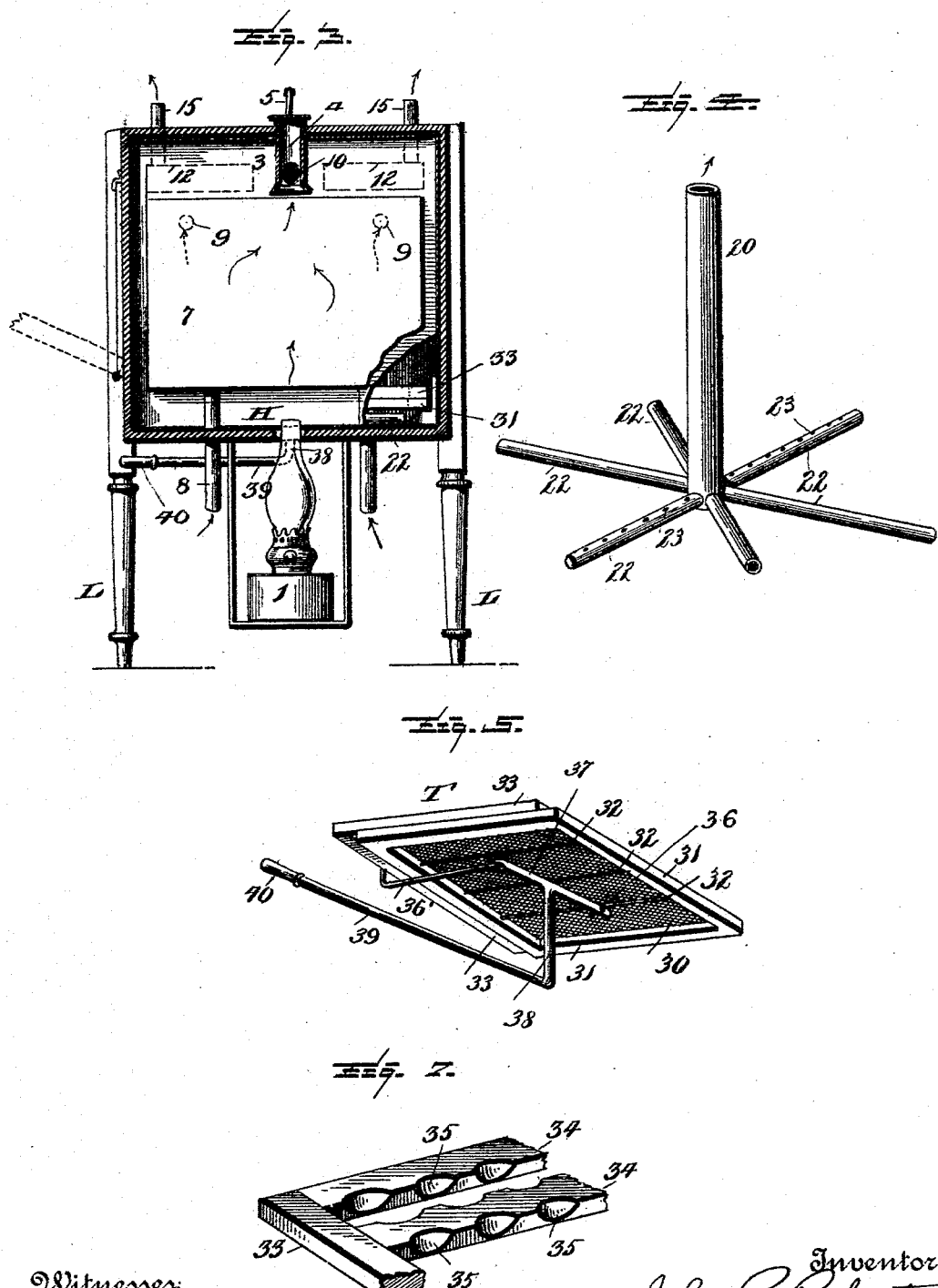

UNITED STATES PATENT OFFICE.

JOHN R. ROBERTS, OF HOMER CITY, PENNSYLVANIA.

INCUBATOR.

SPECIFICATION forming part of Letters Patent No. 515,554, dated February 27, 1894.

Application filed March 29, 1893. Serial No. 468,144. (No model.)

*To all whom it may concern:*

Be it known that I, JOHN R. ROBERTS, a citizen of the United States, and a resident of Homer City, Indiana county, State of Pennsylvania, have invented certain new and useful Improvements in Incubators; and my preferred manner of carrying out the invention is set forth in the following full, clear, and exact description, terminating with claims particularly specifying the novelty.

This invention relates to the care of live stock, and more especially to that class of devices used in this art which are known as incubators; and the object of the same is to effect certain improvements in the heater, the radiating flues, the air outlet, and the egg turner.

To this end the invention consists in an incubator whose preferred manner of construction is described below and illustrated in the drawings, wherein—

Figure 1 is a central longitudinal vertical section of my improved incubator complete. Fig. 2 is a horizontal section thereof taken on the line 2—2 of Fig. 1, drawn just above the radiating flues and beneath their supporting plate. Fig. 3 is a vertical section taken on the line 3—3 of Fig. 1 drawn through the heater and looking toward the body. Fig. 4 is a perspective detail showing the air outlet. Fig. 5 is a perspective detail of the egg turner and its operating devices. Fig. 6 is a section similar to Fig. 1 and showing a modified arrangement of the air flue within the heating chamber. Fig. 7 is a perspective detail of a portion of the egg tray.

Referring to the said drawings the letter B designates the body of an incubator supported by suitable legs L and containing the egg trays T and a suitable water pan W—the body having doors preferably with double glass panels and a heater H, and being otherwise constructed as is usual in devices of this character.

*The heater.*—I have discovered by long experiment in this line that for many reasons it is undesirable to have the products of combustion from the lamp or other source of heat pass through a pipe in the flue which is fed with fresh air from the exterior and which after being heated is passed into the egg chamber. Many incubators have been heretofore constructed in this manner, but I find that advantages will arise if the air flue be interposed between the source of heat and the egg chamber yet so that the products of combustion can pass completely around said air flue— one advantage, for instance, being that the rather intense heat within the heating chamber above the lamp is prevented from coming directly against the partition which separates this chamber from the egg chamber, since the air flue is interposed. In other words, I pass the air flue through the heating chamber, and preferably to one side of the lamp, rather than passing the heating chamber through the air flue as has been heretofore done.

The construction of my heater is about as follows: 1 is a lamp, a gas jet, or any other suitable source of heat, and 2 is an upright box or chamber formed at one end of the body B of the incubator as by partitioning off the body at 3. Into the lower end of the latter passes the heat from the lamp, and from its upper end pass the products of combustion as through a pipe 4, a thermostat or other regulator 5 being here employed if desired. Within the heating chamber is properly supported, as by braces or brackets 6, a flue 7 preferably rectangular, upright, standing out of contact with the inner faces of the walls of said chamber at all points, and usually nearest that side of the chamber which is adjacent the partition 3 in order that the most intense heat shall be on the opposite side of this flue from the partition which separates the heating chamber from the egg chamber.

8 designates one or more small inlet openings or pipes through which fresh air is conveyed from the exterior of the heating chamber to the interior of the flue 7, and 9 designates one or more exit openings or pipes leading from the upper end of this flue through or past the partition 3 and communicating with the egg chamber in a manner to be described below.

*The radiating flues.*—The numeral 10 designates a flue or pipe of suitable size leading from the outlet pipe 4 of the heating chamber, through the partition 3, and out the body B of the incubator to a point near its further end; where it is formed with a T 11. 12 12 are two return flues or chambers preferably somewhat larger than the flue 10 and into which the opposite ends of the T-head 11 lead 13 is a rectangular plate preferably of sheet metal, to the under side of which the flues and the T are suitably attached and by which the whole is supported—the edges of the plate being supported on the body as at 14 or by other suitable means near and just below the cover of the incubator, or this plate may form the cover. 15 are small outlet pipes leading upward from the return flues 12 near the partition 3, passing through the plate 13, and also passing through suitable holes in the cover. From this description it will be understood that when the thermostat or other regulator 5 partially or wholly closes the outlet pipe 4, the products of combustion arising from the lamp will be directed out the central flue 10 into the T 11, back within the return flues 12, and pass out the outlet pipes 15 into the air. At the same time the fresh air passing in at 8, rises into the flue 7 where it is heated by the heat within the chamber 2, and passes out the pipe 9 into the space within the body B just beneath the radiating flues 10 and 12 but above a perforated plate 16, suitably supported within the casing above the egg trays and water pan, and preferably composed of sheet metal.

Heretofore incubators have been provided wherein the radiating flue was a large flat pan connected at one end to the heating chamber and having its outlet near the opposite end; but I have found that the objection to such devices consisted in the fact that the heat near the inlet end of this pan was more intense than desirable, while near the outlet end thereof it was not as high as was desired, and this unequal division of heat in the radiator would be very injurious to the process of incubation or successful hatching of the chicks. If the radiating flues are constructed as herein shown and described, it will be obvious that the heat from the heating chamber will be most intense at the inlet end of the flue 10, will be moderate in the T 11 and at the inlet ends of the return flues 12, and will be least intense at the outlet ends of said return flues. But the intensity of the heat at the inlet end of the flue 10 is offset by the coolness within the adjacent ends of the contiguous flues 12, and hence the resultant heat within the entire chamber will be practically the same at this end thereof as at the other end. If, however, there should be any injuriously high or low temperature at any point or points within this radiating chamber, the presence of the perforated plate 16 a slight distance below the flues will tend to equalize the heat of the fresh air which is passed into the space between the flues and this plate, and which is finally thrown down upon the eggs in their trays.

*The air outlet.*—Rising from a suitable point at the bottom of the incubating chamber is an outlet pipe 20 which passes through the perforated plate 16, between the flue 10 and one of the return flues 12, through the superimposed plate 13, and through the cover of the casing, a suitable slide valve 21 being arranged at the upper end of this pipe by means of which it may be controlled by hand. I have found by experience that if the outlet from the egg chamber is of some considerable size and leads directly to the air, there will frequently occur an inflow of cold air at the same time that the warm air is passing out and through the same opening—thereby often resulting injuriously to the delicate eggs or chicks. In order to overcome this objectionable feature, I provide a number of small pipes 22 resting preferably on the base of the egg chamber and leading from near the corners or sides to and connecting with the upright pipe 20, and these small pipes may be open at their outer ends only or may be provided with fine perforations 23 in their lengths, or both—the object being that the coolest air within and at the bottom of the chamber shall be taken into these smaller pipes at many points, and carried into the main pipe 20 and thereby passed off into the exterior. As this main pipe is upright it creates a slight draft which assists the outflow, and the further fact that this pipe passes adjacent the warm flues 10 and 12 will additionally assist the draft.

*The egg turner.*—It is well known to those familiar with this art that the eggs in the trays must be periodically turned for about one half a revolution in order to effect the proper hatching of the chicks. Heretofore devices have been constructed which consisted of a horizontal screen upon which rested a frame, and within the latter was a number of bars or wires parallel with or at right angles to each other and forming cells each of a suitable size to receive one egg. When it was desired to turn the eggs the screen was moved under the frame or the frame was moved over the screen—either movement causing the eggs to rotate partially. I have found, however, that the eggs which are extremely tender during the process of incubation are liable to be cracked or broken by such movements of the screen or frame, and it is well known that the least crack in the shell will prevent hatching. In order to overcome this objection I provide the following device: 30 is a screen suitably supported as within a frame 31 and possibly having cross strips 32 beneath it. 33 is a second frame resting on the screen and having a number of parallel bars 34, each being about one-half inch thick by one inch in width and spaced from each other about three-quarters of an inch. In the upper corners and side edges of these strips or bars are cut cavities 35 whose bottoms are concaved slightly and stand at a general angle of about forty-five degrees to a horizontal—the cavities in adjacent strips being arranged opposite each other and of sufficient size to support an egg and yet to allow it to pass below the plane of the lower edges of said strips and rest on the screen. In large egg trays I may find it advisable to so form these cavities that they will be slightly graduated in size from one edge of the tray to the other in order to receive eggs of different sizes; or I may make one tray with larger cavities and another with smaller ones, and assort the eggs accordingly. Depending from one of the supporting strips of the screen is a pair of pins 36 which loosely embrace one extremity of a double lever 37 that is centrally secured to the upper end of a rock shaft 38 journaled vertically through a hole in the bottom of the incubator casing; and projecting from the lower end of this rock shaft is a hand-lever 39 whose handle 40 stands within convenient reach of the operator, preferably just under the front edge of the bottom of the incubator. A link 36' is loosely connected with the egg tray or frame and leads to the other extremity of the double lever 37. It will be obvious that when this handle is moved the lever 37 will move the link 36' and pins 36 and will cause the screen to move in one direction while the egg tray or frame will be simultaneously moved in the opposite direction, and hence the eggs will all be turned in their cavities. They are again turned back to the original position when necessary by a return movement of the handle 40.

From the above description the operation of my device will be obvious to all familiar with this art, and I have stated where the descriptions occurred what advantages I claim for the specific constructions of the several elements of my incubator. I do not, however, limit myself to the precise details of construction herein shown and described, as considerable change may be made therefrom without departing from the spirit of my invention. Parts may be used without other parts, and additions may be made, or such alterations in shapes, sizes, and proportions as will occur to the manufacturer or as will be found desirable to meet the requirements of the trade. One slight modification which occurs to me at this time is shown in Fig. 6, where the flue 7 rests upon the bottom of the box 2 and against the partition 3, and the pipes 8 and 9 may therefore be simply openings; but even here I prefer to locate this flue between the source of heat and the partition for the reasons given above. Another modification is that a link, or a pin and eye, could be substituted for the connection 36 between the lever 37 and the screen 30, but this is so obvious that I have not considered it necessary to illustrate it.

What is claimed as new is—

1. In an incubator, an egg turner consisting of a sliding tray having cavities each of a shape and size to support an egg and allow it to project below the tray, a sliding screen below the tray and upon which the eggs rest, a rock-shaft journaled vertically through the bottom of the incubator casing, a double lever centrally connected with the inner end of said shaft, a link connecting one end of said lever with the tray, loose connections between the opposite end of said lever and the screen, and a hand lever on the outer end of the shaft, as and for the purpose set forth.

2. In an incubator, the combination with an egg chamber, and superimposed radiator flues for supplying heated air to the interior thereof; of an air outlet consisting of small pipes near the bottom of said chamber leading from remote points therein to a common center, and a single pipe leading upward from said center, between the radiator flues, and out through the top of the casing, as and for the purpose set forth.

3. In an incubator, the combination with an egg chamber, and means for supplying heated air to the interior thereof; of an air outlet consisting of small perforated pipes near the bottom of said chamber leading from remote points therein to a common center, and a single pipe leading from said center and out through the top of the casing, as and for the purpose set forth.

4. In an incubator, the combination with the casing having a vertical partition forming an egg compartment and a heating chamber, and a radiator within said compartment; of a source of heat at the bottom of said chamber, an exit pipe at the top, a regulator therefor, a branch pipe connecting the exit pipe with the radiator, a closed air flue supported within said chamber between the source of heat and said partition, an inlet to said flue from the external air, and an outlet therefrom connecting with the egg compartment below the radiator, as and for the purpose set forth.

5. In an incubator, the combination with the casing having a vertical partition forming an egg compartment and a heating chamber; of a source of heat at the bottom of said chamber, an exit pipe at the top, a radiator within the egg compartment consisting of the central flue connected with said exit pipe and two return flues connected with the further end of said central flue and leading alongside of and remote from the same to suitable outlets, an air flue supported within said chamber between the source of heat and said partition, an inlet to said flue from the external air, an outlet therefrom leading through the partition into the egg compartment below the radiator, an air outlet pipe leading from the bottom of the egg compartment upward between the flues of the radiator and out the top of the device, and a valve outside the device for controlling this pipe, as and for the purpose set forth.

6. In an incubator, the combination with the casing having a vertical partition forming an egg compartment and a vertical heating chamber; of a source of heat at the bottom of said chamber, an exit pipe at the top, a regulator for said exit pipe on the exterior of the device, a radiator within the egg compartment connected with said exit pipe, a perforated plate below the radiator, an air flue supported within said chamber between the source of heat and said partition yet out of contact with all walls of the heating chamber and out of the direct line between the source of heat and the exit pipe, an inlet to said flue from the external air, and an outlet therefrom connecting with the egg compartment at a point below the perforated plate, as and for the purpose set forth.

7. In an incubator, the combination with a casing containing an egg compartment and a heating chamber at one end thereof, a heater therein, an air flue within the heating chamber, and a pipe leading from said flue into the egg compartment; of a radiator connected with said chamber and secured beneath a horizontal plate within said compartment above the air-inlet pipe, and a perforated plate across this compartment below said pipe, as and for the purpose set forth.

8. In an incubator, the combination with a casing containing an egg compartment and a heating chamber, a heater therein, an air flue within the heating chamber, and a pipe leading from said flue into the egg compartment; of a radiator connected with said chamber and above the air-inlet, and a perforated plate below said inlet, as and for the purpose set forth.

9. In an incubator, the combination with a casing containing an egg compartment and a heating chamber, a heater therein, an air flue within the heating chamber, and a pipe leading from said flue into the egg compartment; of a radiator consisting of a central flue leading from said heating chamber, a T at the further end of this flue, return flues connected with the arms of the T and standing alongside of and slightly remote from the central flue, and outlets in the return flues, as and for the purpose set forth.

In testimony whereof I have hereunto subscribed my signature on this the 25th day of March, A. D. 1893.

JOHN R. ROBERTS.

Witnesses:
SPEER W. GUTHRIE,
NEWTON L. COLLAMER.